United States Patent
Cho et al.

(10) Patent No.: US 9,471,267 B2
(45) Date of Patent: Oct. 18, 2016

(54) MOBILE TERMINAL AND METHOD OF CONTROLLING THE SAME

(71) Applicant: LG ELECTRONICS INC., Seoul (KR)

(72) Inventors: Eunhyung Cho, Seoul (KR); Sinae Chun, Seoul (KR); Doyoung Lee, Seoul (KR); Jongho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/541,770

(22) Filed: Nov. 14, 2014

(65) Prior Publication Data

US 2015/0254044 A1    Sep. 10, 2015

(30) Foreign Application Priority Data

Mar. 10, 2014  (KR) .................. 10-2014-0027893

(51) Int. Cl.
| | |
|---|---|
| G06F 3/14 | (2006.01) |
| H04M 1/02 | (2006.01) |
| G06F 3/0488 | (2013.01) |
| G06F 1/16 | (2006.01) |
| G09G 5/14 | (2006.01) |

(52) U.S. Cl.
CPC ........... *G06F 3/1423* (2013.01); *G06F 1/1647* (2013.01); *G06F 3/0488* (2013.01); *G09G 5/14* (2013.01); *H04M 1/0266* (2013.01); *G09G 2300/023* (2013.01); *H04M 2250/16* (2013.01); *H04M 2250/52* (2013.01)

(58) Field of Classification Search
CPC combination set(s) only.
See application file for complete search history.

(56) References Cited

U.S. PATENT DOCUMENTS

| | | | |
|---|---|---|---|
| 8,593,401 B1 | 11/2013 | Kim et al. | |
| 2007/0188450 A1* | 8/2007 | Hernandez | G06F 1/1626 345/158 |
| 2010/0020034 A1 | 1/2010 | Kim | |
| 2010/0048252 A1* | 2/2010 | Kang | H04M 1/72522 455/566 |
| 2013/0113681 A1* | 5/2013 | Zhang | G06F 1/1626 345/1.1 |
| 2014/0184471 A1* | 7/2014 | Martynov | G06F 3/1423 345/1.2 |
| 2015/0363033 A1* | 12/2015 | Okabe | H04W 52/0254 345/173 |

FOREIGN PATENT DOCUMENTS

| | | |
|---|---|---|
| KR | 10-2010-0023603 A | 3/2010 |
| KR | 10-2011-0068029 A | 6/2011 |
| KR | 10-2011-0125356 A | 11/2011 |

* cited by examiner

*Primary Examiner* — Junpeng Chen
(74) *Attorney, Agent, or Firm* — Birch, Stewart, Kolasch & Birch, LLP

(57) ABSTRACT

A mobile terminal, capable of effectively providing information by using double-sided display units, includes: first and second display units disposed on different sides; a memory unit configured to store both an image and information associated with the image; and a controller configured to control at least one of the first and second display units to display the image and the information associated with the image according to any one among first and second display modes, wherein, in the first display mode, the image and the information associated with the image are displayed on any one of the first and second display units, and in the second display mode, when the image is displayed on any one of the first and second display units, the information associated with the image is displayed on the other of the first and second display units.

18 Claims, 20 Drawing Sheets

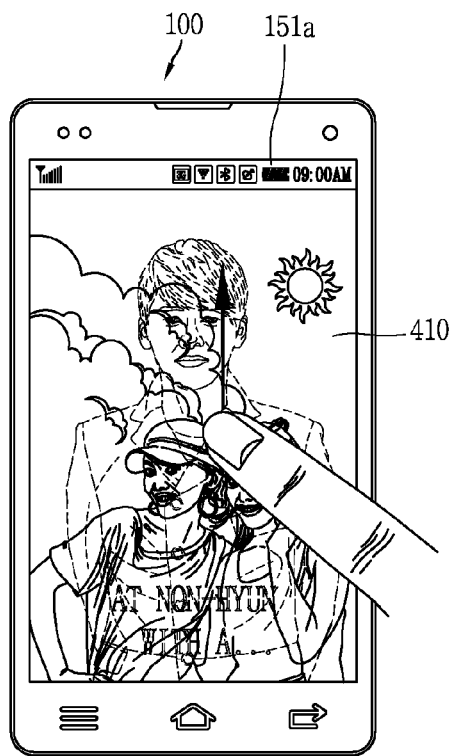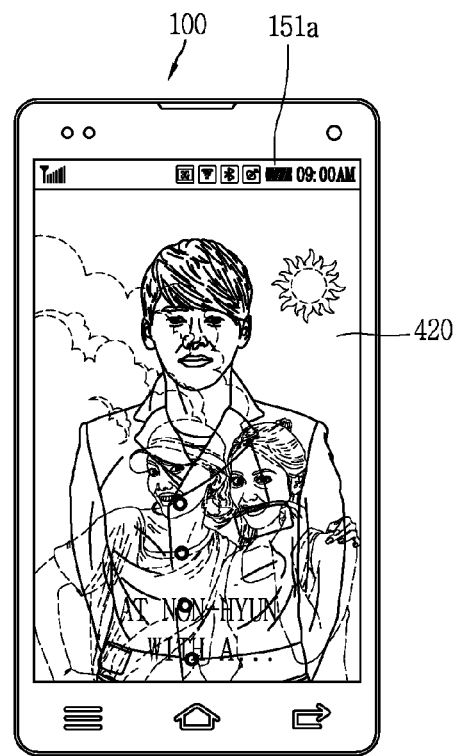
FIG. 8D(a)
FIG. 8D(b)

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0027893, filed on Mar. 10, 2014, the contents of which is incorporated by reference herein in its entirety.

BACKGROUND OF THE INVENTION

1. Field of the Invention

The present disclosure relates to a mobile terminal capable of effectively providing information using double-sided display units and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing or multimedia player function. In particular, more recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

As part of the structural improvement, mobile terminals having double-sided display units have been developed. Thus, the need to develop a method for effectively providing information using double-sided display units has emerged.

SUMMARY OF THE INVENTION

Therefore, an aspect of the detailed description is to effectively provide information by using double-sided display units.

To achieve these and other advantages and in accordance with the purpose of this specification, as embodied and broadly described herein, a mobile terminal, capable of effectively providing information by using double-sided display units, may include: first and second display units disposed on different sides; a memory unit configured to store both an image and information associated with the image; and a controller configured to control at least one of the first and second display units to display the image and the information associated with the image according to any one among first and second display modes, wherein, in the first display mode, the image and the information associated with the image are displayed on any one of the first and second display units, and in the second display mode, when the image is displayed on any one of the first and second display units, the information associated with the image is displayed on the other of the first and second display units.

In an exemplary embodiment of the present disclosure, based on a pre-set condition with respect to the image, the controller may display the image and the information associated with the image according to any one of the first and second display modes.

In an exemplary embodiment of the present disclosure, the pre-set condition may be a condition related to storage information of the image, and when the storage information of the image includes first information, the controller may enter the first display mode and display the image on any one of the first and second display units according to the first display mode, and when the storage information of the image includes second information different from the first information, the controller may enter the second display mode, display the image on any one of the first and second display units according to the second display mode, and display the information associated with the image on the other of the first and second display units.

In an exemplary embodiment of the present disclosure, when the image is displayed on any one of the first and second display units according to the first display mode, the controller may output a graphic object indicating that there is information associated with the image to one region of the image.

In an exemplary embodiment of the present disclosure, when the image is displayed on any one of the first and second display units according to the second display mode, the controller may display a graphic object indicating that there is information associated with the image on the second display unit, at a portion of the image displayed on the any one of the first and second display units.

In an exemplary embodiment of the present disclosure, in response to selection of the graphic object, the controller may provide control to display the image displayed on the other of the display units, on the any one of the display units, and display the image displayed on the any one of the display units, on the other of the display units.

In an exemplary embodiment of the present disclosure, when a pre-set type of touch is applied to the image displayed on the any one of the display units, the controller may control the first and second display units such that the image is output to the other of the display units and the information associated with the image is output to the any one of the display units.

In an exemplary embodiment of the present disclosure, the mobile terminal may further include: at least two camera units configured to capture images in different directions, wherein the pre-set condition may be a condition under which the at least two camera units capture images together, and in a case in which the images received from the at least two camera units are captured together according to a user request, the controller may display any one of the at least two captured images on any one of the first and second display units and display the other of the at least two captured images on the other of the first and second display units.

In an exemplary embodiment of the present disclosure, when images captured from the at least two camera units are captured together, the controller may output a combined image of the at least two images to any one of the first and second display units.

In an exemplary embodiment of the present disclosure, a plurality of images and information associated with the plurality of images are stored in the memory unit, and in a state in which any one of the plurality of images and information associated with the any one of the plurality of images are respectively displayed on the first and second display units according to the second display mode, when the displayed any one of the plurality of images may be changed to another among the plurality of images, the information associated with the any one of the plurality of images is changed to information associated with another among the plurality of images, so as to be displayed.

In an exemplary embodiment of the present disclosure, when the image displayed on the any one of the first and second display units is not displayed any longer, the controller may not display the information associated with the image displayed on the other of the plurality of display units any longer.

In an exemplary embodiment of the present disclosure, the mobile terminal may further include: a sensing unit configured to sense the pupil of a user, wherein when the mobile terminal is in the second display mode, the controller may display the image on the display unit that the sensed user's pupil is viewing, among the first and second display units, and display the information associated with the image on the other of the first and second display units.

In an exemplary embodiment of the present disclosure, when the mobile terminal is in the second display mode and the information associated with the image displayed on the any one of the first and second display units is not stored in the memory unit, the controller may display recommendation information related to the image displayed on the any one of the first and second display units.

In an exemplary embodiment of the present disclosure, the recommendation information may be detected based on image analysis information of the image displayed on the any one of the first and second display units.

In an exemplary embodiment of the present disclosure, the mobile terminal may further include: a camera unit configured to capture an image, wherein the pre-set condition may be a condition under which an image is captured by using the camera unit, and in a state in which the image captured by using the camera unit is displayed on any one of the first and second display units, the controller may output screen information for receiving memory information from the user to the other of the first and second display units.

In an exemplary embodiment of the present disclosure, the memo information received form the user may be processed in association with the captured image so as to be output together with the captured image, and when the captured image is displayed on any one of the first and second display units, the controller may display the memo information received form the user on the other of the first and second display units.

In an exemplary embodiment of the present disclosure, when a control command for displaying an image stored in the memory unit on at least one of the first and second display units is received, the controller may display screen information for selecting any one of the first and second display modes on any one of the first and second display units.

To achieve these and other advantages and in accordance with the purpose of this specification, as embodied and broadly described herein, a method for controlling a mobile terminal includes: capturing an image; displaying the captured image on any one of first and second display units disposed on different sides; and displaying information associated with the captured image on the other of the first and second display units, wherein the information associated with the captured image is memo information input from a user after the image is captured.

In an exemplary embodiment of the present disclosure, a graphic object indicating that the information associated with the image is being output to the other of the first and second display units may be displayed in one region of the image displayed on the any one of the first and second display units.

In an exemplary embodiment of the present disclosure, when a pre-set type of touch is applied to the graphic object, the image displayed on the any one of the first and second display units may be displayed on the other of the first and second display units, and the information associated with the image displayed on the other of the first and second display units may be displayed on the any one of the first and second display units.

In an exemplary embodiment of the present disclosure, the information associated with the image displayed on the other of the first and second display units may be a combined image combined with the image displayed on the any one of the first and second display units.

In an exemplary embodiment of the present disclosure, when the image displayed on the any one of the first and second display units is not output any longer, the information associated with the image displayed on the other of the plurality of display units may not be output any longer.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
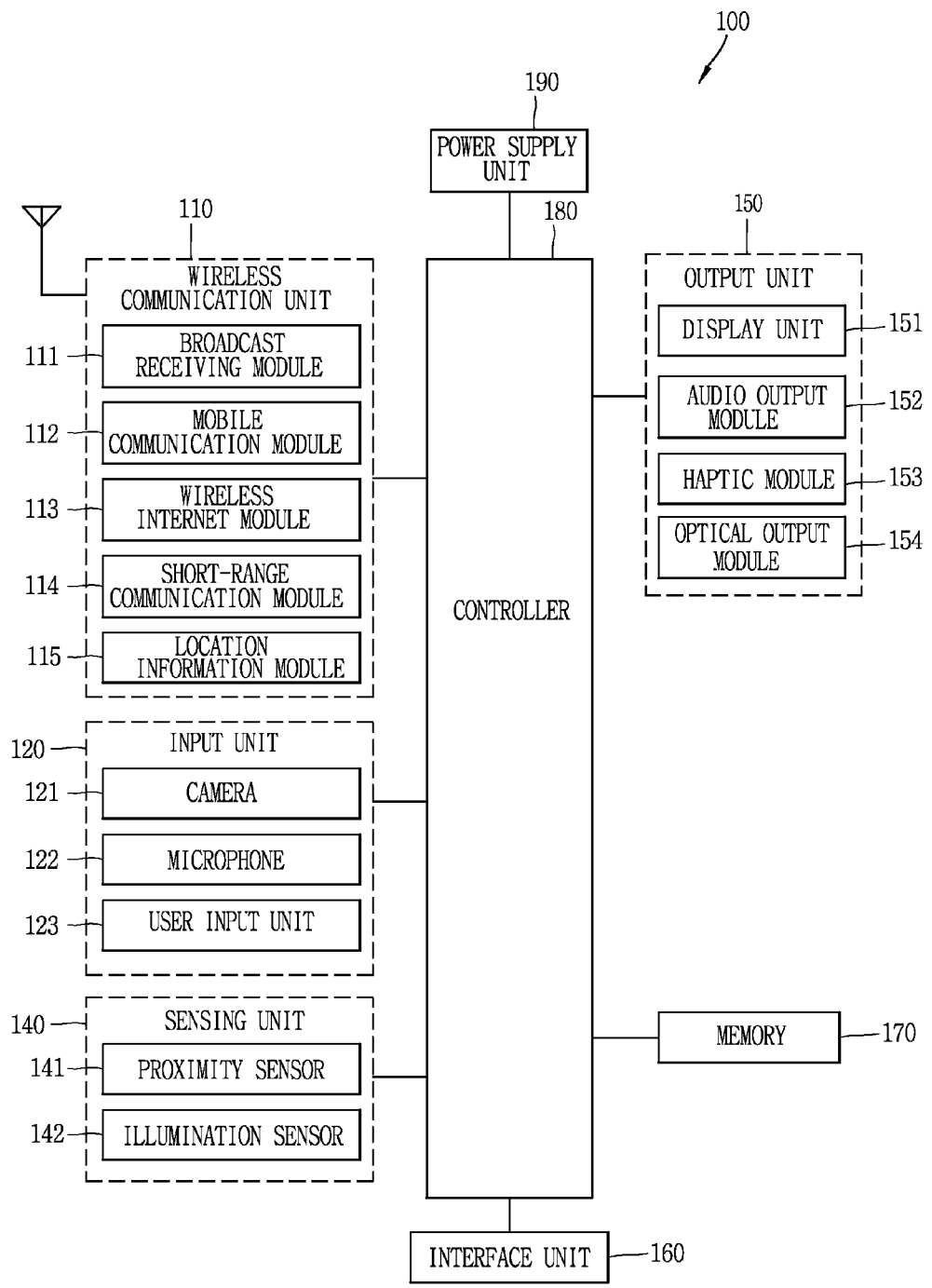
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
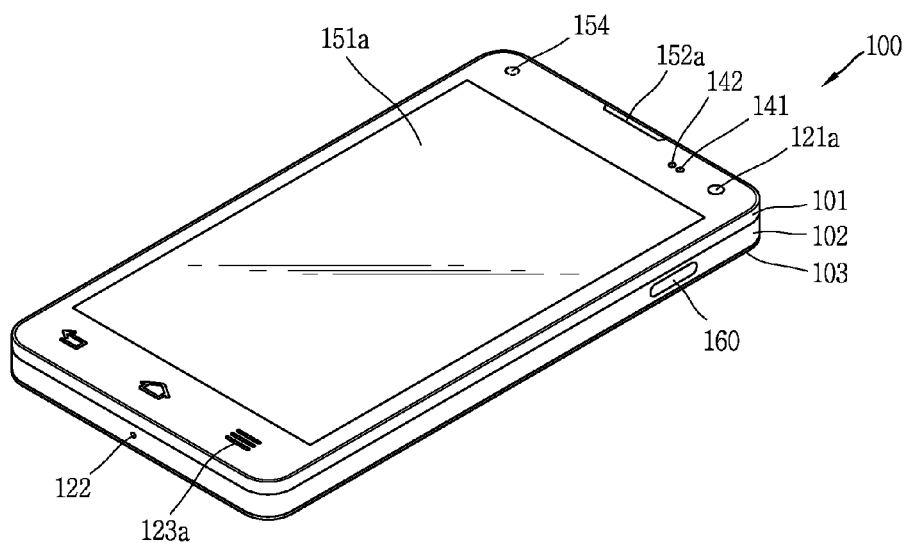
FIGS. 1B and 1C are conceptual views of one example of the mobile terminal, viewed from different directions.
Figure 1C:
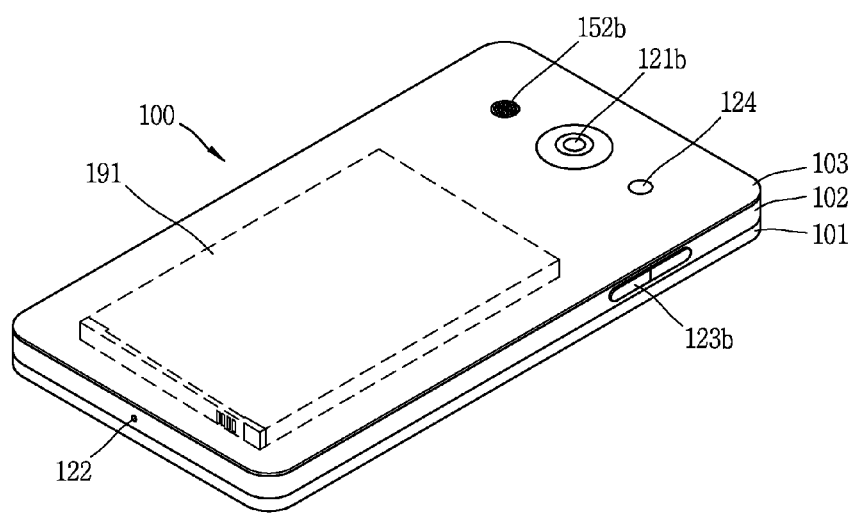

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1B. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Global Positioning System (GPS) satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

Hereinafter, embodiments related to a control method that can be implemented in the mobile terminal configured as described above will be described with reference to the accompanying drawings. It is apparent to those skilled in the art that modification, alteration, and improvement can be made to the present invention within a scope that does not deviate from the nature and gist of the present invention.

Figure 2:
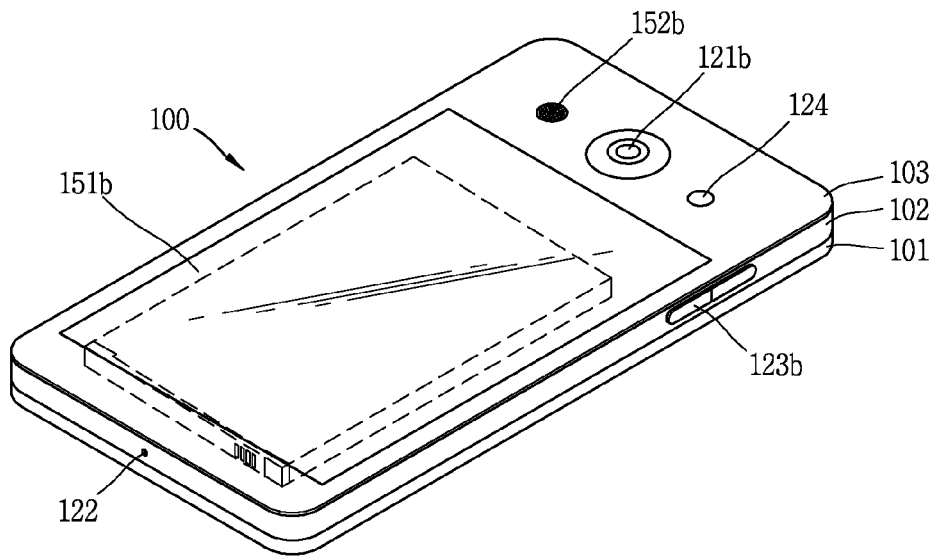
FIG. 2 is a conceptual view illustrating a rear display unit when a plurality of display units are provided in a mobile terminal according to an exemplary embodiment of the present disclosure.

FIG. 2 is a conceptual view illustrating a rear display unit 151b when a plurality of display units are provided in a mobile terminal according to an exemplary embodiment of the present disclosure.

In an exemplary embodiment of the present disclosure, a plurality of display units may be provided. Here, the plurality of display units may be disposed on different surfaces according to an implementation form.

That is, the plurality of display units may be disposed separately or integrally in the terminal body or may be disposed on different surfaces.

For example, as illustrated in FIG. 2, the mobile terminal according to an exemplary embodiment of the present disclosure may have display units 151a and 151b disposed on the rear of the terminal body, as well as on the front of the terminal body. However, the components may not be limited to the disposition. The components may be excluded or replaced as needed or may be disposed on different surfaces. For example, the plurality of display units may be disposed on the side of the terminal body.

Meanwhile, the display unit 151b disposed on the rear surface of the terminal body may execute all the functions that can be executed on the display unit 151a disposed on the front surface of the terminal body. For example, the display unit 151b disposed on the rear surface of the terminal body may include a touch sensor for sensing a touch applied to the display unit 151b, and may receive various control commands by using a touch sensed by using the touch sensor.

Hereinafter, a case in which a plurality of display units are separately disposed on the front surface and the rear surface will be described, but the present disclosure is not limited thereto and disposition of a plurality of display units may be variously modified according to an implementation form.

Figure 3:
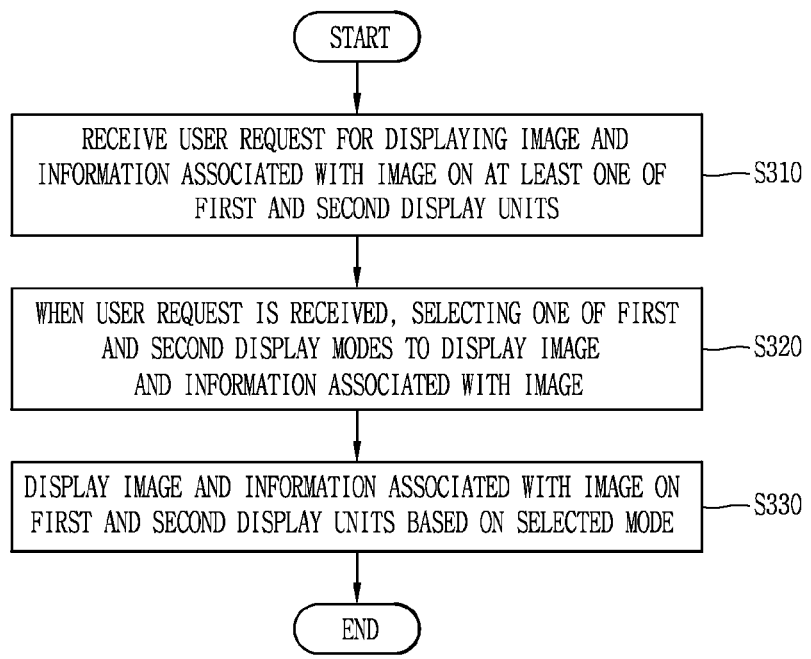
FIG. 3 is a flow chart illustrating a control method of displaying screen information on a plurality of display units in a mobile terminal according to an embodiment of the present disclosure.
Figure 4A:
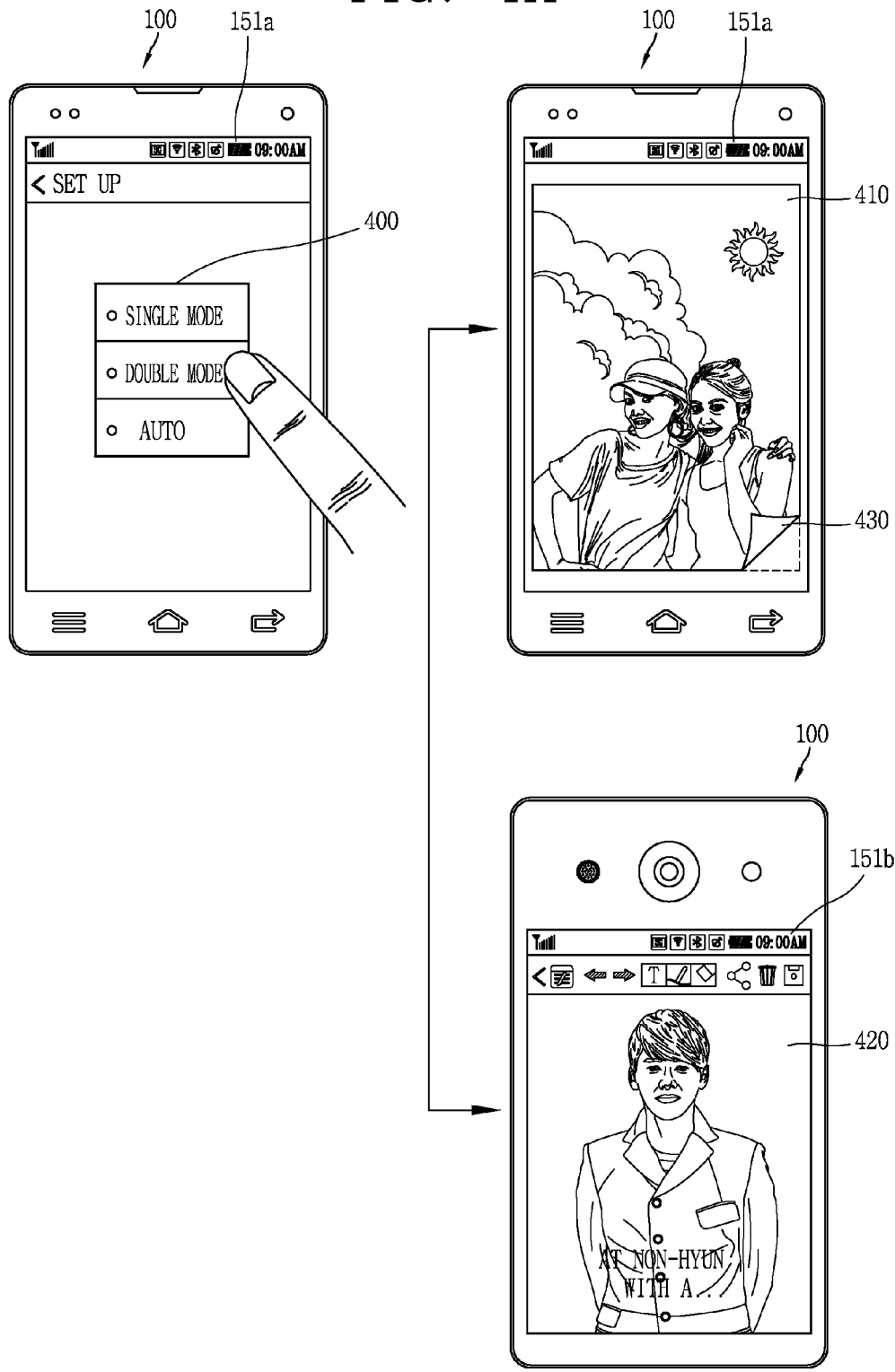
FIGS. 4A, 4B(a) to (b), and 4C are conceptual views illustrating a method of displaying screen information on a plurality of display units.
Figure 4B:
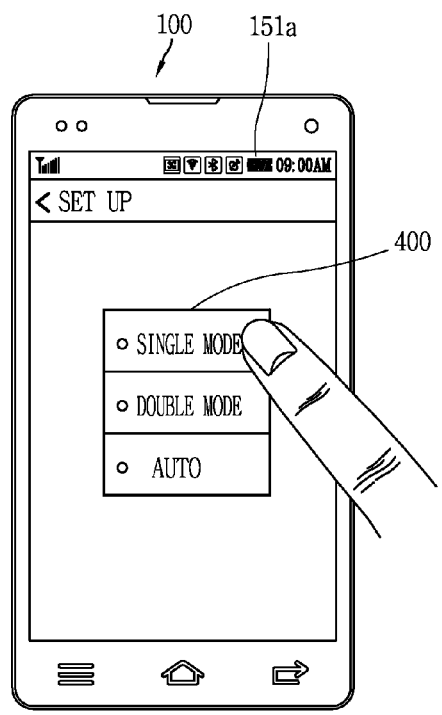
Figure 4B:
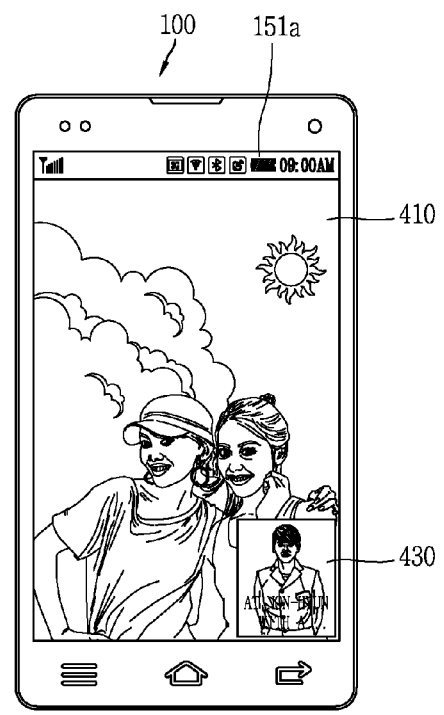
Figure 4C:
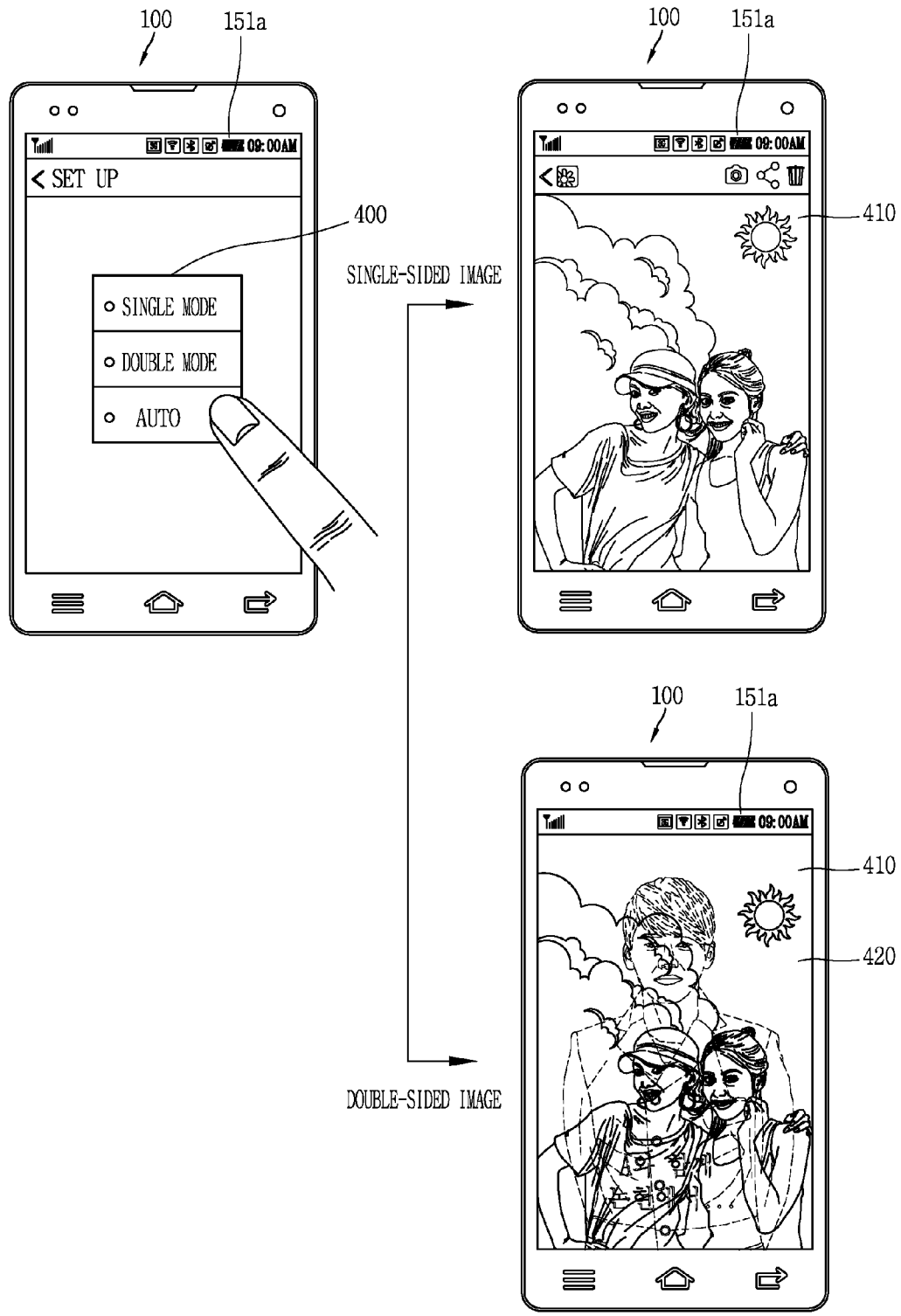

Hereinafter, a method of displaying screen information on the plurality of display units in the mobile terminal having the plurality of display units. FIG. 3 is a flow chart illustrating a control method of displaying screen information on a plurality of display units in a mobile terminal according to an embodiment of the present disclosure, and FIGS. 4A, 4B, and 4C are conceptual views illustrating a method of displaying screen information on a plurality of display units.

In the mobile terminal including a plurality of display units, in order to display screen information on the plurality of display units, the controller 180 may control the plurality of display units together. For example, the controller 180 may control the plurality of display units such that any one of the plurality of display units displays screen information or at least two of the plurality of display units display screen information. That is, the controller 180 may provide screen information in various manners using the plurality of display units.

Meanwhile, various types of information related to the mobile terminal may be stored in the memory unit 170. For example, an image captured using the camera unit 121 and information associated with the image may be stored in the memory unit 170.

Here, the information associated with the image may be various types of information incidental to the image, such as an image captured together with the image, meta data information (or log information) of the image, an image analysis information obtained by analyzing the image, or the like.

Also, the information associated with the image may be set by the user or may be automatically generated when the image is captured. The information that may be automatically generated when the image is captured may include an image capture time, an image capture location, an image capture date, a size of the image, storage information of the image, and the like.

The plurality of display units may display the image stored in the memory unit 170 and the information associated with the image. Here, the controller 180 may control the plurality of display units to display the image and the information associated with the image in various forms.

First, the mobile terminal according to an exemplary embodiment of the present disclosure may receive a user's request for displaying an image and information associated with the image on at least one of the first and second display units in step S310.

The user may apply a request for displaying at least one among a plurality of images stored in the memory unit 170 on a display unit to the controller of the mobile terminal.

The user's request for displaying the image may be made by a touch applied to the display unit 151. For example, the user may transmit a request for displaying at least one of the plurality of images stored in the memory unit 170 on the first and second display units to the mobile terminal by applying a touch to any one of the first and second display units.

Meanwhile, in order to display the image and the information associated with the image on the display unit, the user may execute an application executing a function to output an image. Here, the application executing the function of outputting an image may be executed by applying a touch to an icon indicating the application.

When the application for executing the function of outputting an image is executed, an execution screen of the application executing the function of outputting an image may be displayed on at least one of the first and second display units.

Here, a thumbnail image representing a portion of the plurality of images stored in the memory unit 170 may be included in the execution screen. Through the thumbnail image, the user may check the plurality of images stored in the memory unit 170.

When a touch is applied to the thumbnail image, the controller 180 may control the display unit to output an image representing the thumbnail image to the entire region of the display unit.

Meanwhile, when a user's request for displaying the image is received, the mobile terminal according to an exemplary embodiment of the present disclosure may select in which of a first display mode and a second display mode the image and the information associated with the image are to be displayed in step S320.

When a user's request for displaying any one of the plurality of images stored in the memory unit 170, in the entire output region of any one of the display units is received, the controller 180 may control the plurality of display units to display the image.

Here, based on a pre-set condition with respect to the image selected by the user, the image may be displayed on the plurality of display units according to any one of the first display mode and the second display mode.

The first display mode may be a mode in which the image is displayed on any one of the first and second display units. That is, in the first display mode, the other of the first and second display units may not display the image. In this case, the other display unit may be in a deactivated state or may display screen information irrelevant to the user's request for displaying the image.

Here, deactivation of the display unit may be understood as a state in which screen information is not displayed on the display unit. That is, lighting of the display unit is turned off, and thus, the user cannot view screen information.

Also, the screen information irrelevant to the user's request for displaying the image may be execution screen information of an application which has been executed on the mobile terminal, a home screen page, or the like.

Also, the second display mode may be a mode in which an image is displayed on any one of the first and second display units and information associated with the image is displayed on the other of the first and second display units. For example, in the second display mode, when a user's request for outputting an image to any one of the first and second display units is received, the image may be displayed on the any one of the first and second display units and the information associated with the image may be displayed on the other of the first and second display units.

That is, in the second display mode, the information associated with the image, as well as the image requested to be output by the user, may be provided together to the user by using the plurality of display units.

Meanwhile, when the user's output request for outputting the image is received, the controller may display the image and the information associated with the image according to any one of the first and second display modes based on the pre-set condition for the image.

The pre-set condition with respect to the image may be a storage form of the image, a captured state of the image, or the like. Also, the pre-set condition may be set by the user.

The storage form of the image may include a first form in which only the image is stored, a second form in which the image and the information associated with the image are stored together, and a third form in which the image, the information associated with the image, and association information regarding the image and the information associated with the image are stored together, or the like. Here, the storage form may be variously modified according to an implementation form of the mobile terminal.

Also, the captured state of the image may be state information when the image was captured by using the camera unit 121. For example, the captured state of the image may be a captured state of the image captured by using a plurality of cameras 121$a$ and 121$b$.

The controller 180 may enter any one of the first and second display modes according to a pre-set condition with respect to the image.

Here, the user may change the mode entered by the controller 180. That is, the user may manually change the mode entered according to the pre-set condition. In detail, the user may execute a setting function for changing the display mode, and directly change a currently set mode by using the setting function.

When any one of the first and second display modes is entered, the controller 180 may display the image and the information associated with the image on the first and second display units according to the entered mode in step S330.

When a user request for outputting an image is received, the controller 180 may control the first and second display units to display the image according to the first and second display modes.

In detail, when the mobile terminal is in the first display mode, the controller 180 may display an image on any one of the first and second display units. Here, when there is information associated with the displayed image, a graphic object representing the information associated with the image may be displayed in one region where the image is displayed. Accordingly, through the displayed graphic object, the user may recognize that there is information associated with the image.

Also, when the mobile terminal is in the second display mode, the controller 180 may display an image on any one of the first and second display units, and display the information associated with the image on the other of the first and second display units. That is, the controller 180 may provide the image and the information associated with the image by using both the first and second display units.

In this case, on which of the first and second display units the image is to be displayed may be determined according to a pre-set condition or may be determined by a user selection. For example, the controller 180 may display the image on the display unit 151 which has sensed the image output request among the first and second display units. Conversely, the controller 180 may not display the image on the display unit 151 which has not sensed the image output request.

That is, in the exemplary embodiment of the present disclosure, the image may be provided to the user in various manners by using the first and second display units.

In an exemplary embodiment of the present disclosure, the controller 180 may display the image and the information associated with the image in any one of the first and second display modes according to a user selection.

For example, as illustrated in (a) of FIG. 4A, the controller 180 may output screen information 400 allowing the user to set a display mode of an image to the display unit 151. Here, in (a) of FIG. 4A, the screen information 400 for selecting any one of the first display mode (i.e., a single mode), the second display mode (i.e., a double mode), and an automatic mode may be displayed. The names of the modes may be changed to any other terms designating the same functions by a person skilled in the art.

Meanwhile, based on the user selection, the controller 180 may display an image 410 and information 420 associated with the image on both the first and second display units 151a and 151b.

For example, when the user selects the double mode as illustrated in (a) of FIG. 4A, the image 410 and the information 420 associated with the image may be displayed on the first and second display units 151a and 151b, respectively, as illustrated in (b) and (c) of FIG. 4.

Here, the display unit on which the image is to be displayed, among the first and second display units 151a and 151b, may be determined according to a pre-set condition or may be determined by a user selection. Here, the pre-set condition may be a condition for sensing a user request for outputting an image. For example, the controller 180 may display the image 410 on the front display unit 151a (which corresponds to a first display unit) requested to output the image and display the information 420 associated with the image on the rear display unit 151b (which corresponds to a second display unit).

Also, in a case in which the image 410 is displayed on any one of the first and second display units 151a and 151b, the controller 180 may output a graphic object 430 indicating that the information 420 associated with the image is displayed on the other of the first and second display units 151a and 151b to one region of the any display unit. For example, as illustrated in (b) of FIG. 4A, when the image is displayed on the front display unit 151a, the graphic object 430 indicating that the image is displayed may be output to the rear display unit 151b. Since the graphic object 430 is displayed, the user may recognize that the information associated with the image that he or she is currently viewing is displayed on the rear display unit 151b.

Also, the controller 180 may display the image and the information associated with the image by using only any one of the first and second display units 151a and 151b.

For example, as illustrated in (a) of FIG. 4B, the user may select the single mode. In this case, the controller 180 may display the image 410 and the information 420 associated with the image together on any one of the first and second display units. That is, as illustrated in (b) of FIG. 4B, the controller 180 may display the image 410 on the first display unit 151a disposed on the front side and display the graphic object 430 representing the information associated with the image in one region of the display unit 151a.

Also, the controller may differentiate schemes of displaying the image and the information associated with the image on the first and second display units based on a pre-set condition.

For example, as illustrated in (a) of FIG. 4C, the user may select the "automatic mode" in which a scheme of displaying an image on the first and second display units is automatically determined by the user 180. Here, the term of automatic mode may be freely changed.

Also, in a case in which the first and second display modes are not selected by the user, the automatic mode may be set as a default. For example, the automatic mode may be a basic set value at the time of releasing the mobile terminal.

In the automatic mode, an image may be displayed on the first and second display units according to any one of the first and second display modes based on a pre-set condition.

The pre-set condition may be any one of storage information of the image requested to be output to the display unit and a capture state of the image.

That is, the controller 180 may enter any one of the first and second display modes according to storage information of the image requested to be output, among the plurality of images stored in the memory unit 170.

In detail, in a case in which the storage information of the image includes first information, the controller 180 may enter the first display mode. Here, the first information may be storage information for controlling displaying of only an image on one display unit.

When the first display mode is entered, the controller 180 may display the image requested to be output to any one of the first and second display units. Also, the controller 180 may not display screen information on the other of the display units or may maintain screen information which has been displayed before the image output request, independently from the image output request. That is, the controller 180 may control only any one of the display unit among the first and second display units in the first display mode, and may not control the other display unit.

For example, as illustrated in (b) of FIG. 4C, the controller 180 may output the image 410 to the first display unit 151a disposed on the front side of the mobile terminal. In this case, although not shown, screen information may not be displayed on the second display unit disposed on the rear side or screen information unrelated to the image may be displayed on the second display unit.

Also, when the storage information of the image includes second information, the controller 180 may enter the second display mode. Here, the second information may be storage information for controlling that the image and the information associated with the image are displayed together on the first and second display units.

When the second display mode is entered, the controller 180 may display the image requested to be output on the first and second display units. For example, as illustrated in (c) of FIG. 4C, the image 410 may be displayed on the first display unit 151a disposed on the front side. Also, the information 420 associated with the image 410 may be displayed on the second display unit 151b disposed on the rear side.

In the above, the case in which modes are set by the user has been described, but the present disclosure is not limited thereto and modes may be automatically set by the controller 180. Through the methods as described above, the user may effectively utilize the double-sided display units. Also, the present disclosure may provide a method enabling a user to use the mobile terminal more intuitively, to the user. Thus, the user may easily utilize complicated functions of the mobile terminal.

Figure 5A:
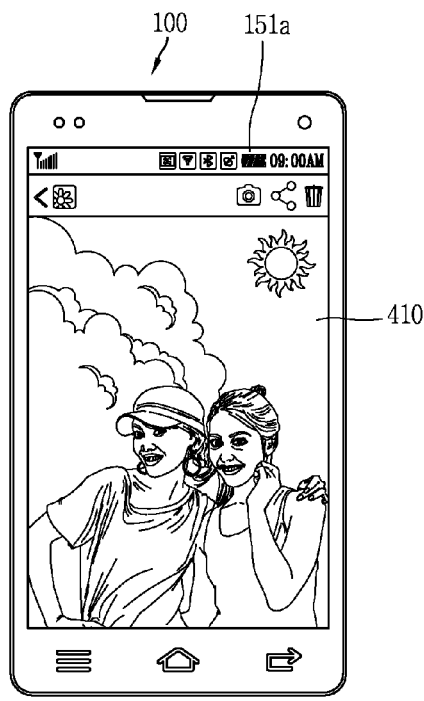
FIGS. 5A(a) to (b), 5B(a) to (b), and 5C(a) to (b) are conceptual views illustrating types of information displayed on the other display unit when an image is displayed on any one of first and second display units in a second display mode.
Figure 5A:
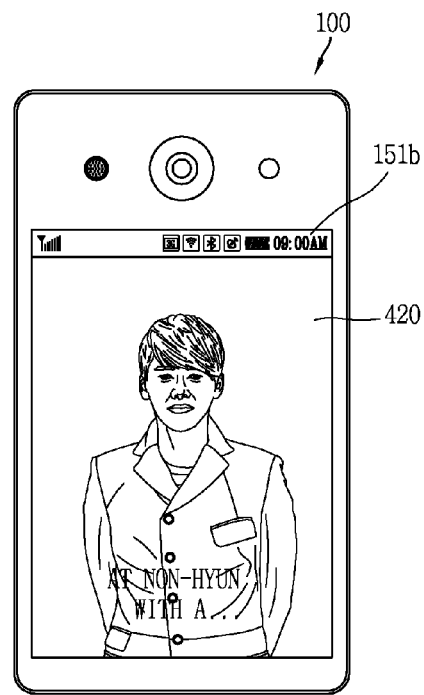
Figure 5B:
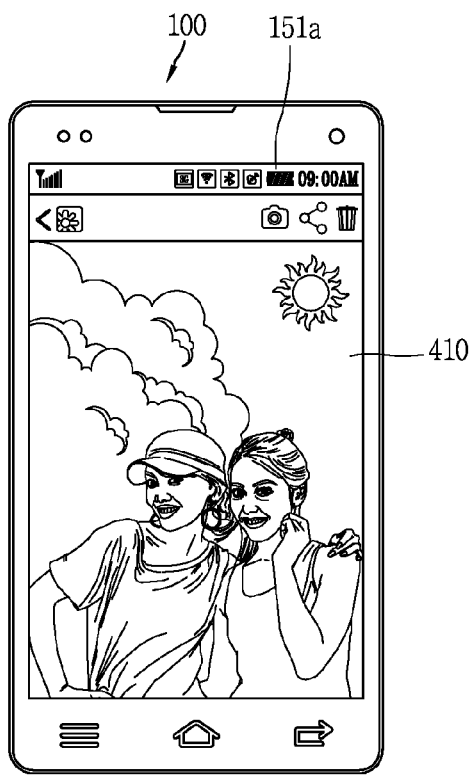
Figure 5B:
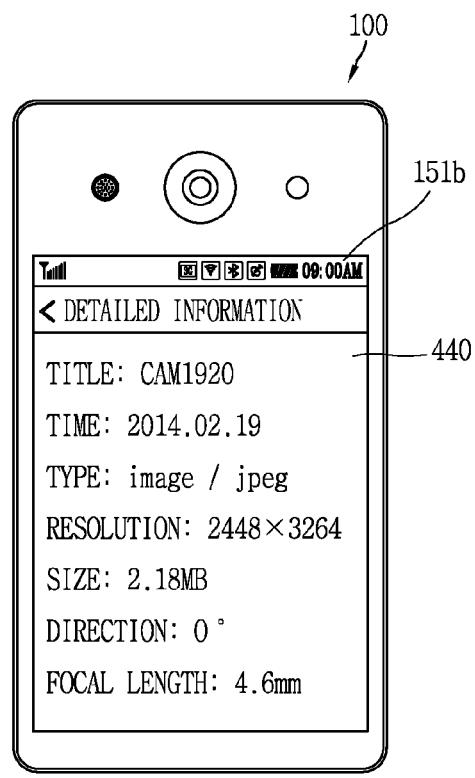
Figure 5C:
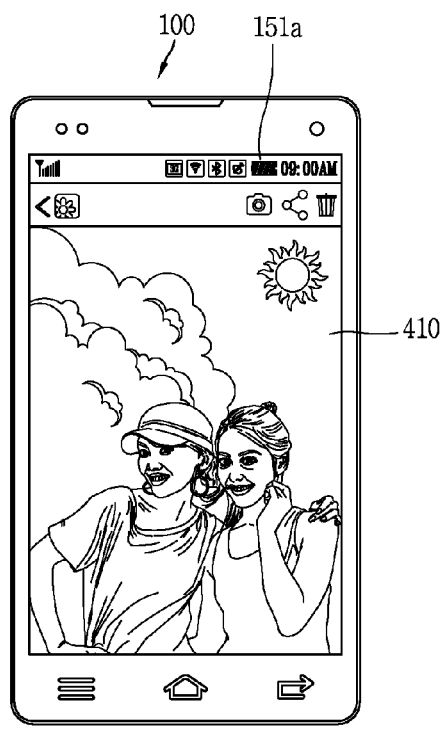
Figure 5C:
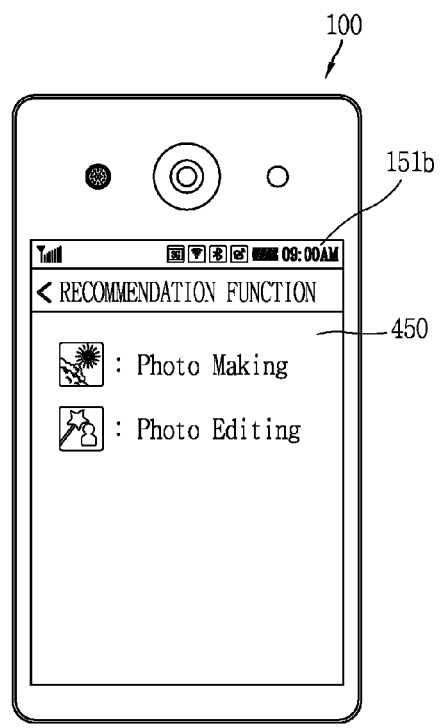

Hereinafter, information displayed on the other of first and second display units when an image is displayed on any one of the first and second display units in the second display mode will be described. FIGS. 5A, 5B, and 5C are conceptual views illustrating types of information displayed on the other display unit when an image is displayed on any one of first and second display units in a second display mode.

When the mobile terminal is in the second display mode, in a case in which an image is displayed on any one of the first and second display units, the controller 180 may display information associated with the image on the other of the display units.

The information associated with the image may be character information, image information, application information related to the image, the image analysis information, meta data information of the image, or the like.

For example, as illustrated in (b) of FIG. 5A, the information associated with the image may be information 420 formed as a combination of an image and text. In this case, the information 420 formed as a combination of the image and the text may be information 420 input by the user immediately after the image 410 is captured.

In another example, as illustrated in (b) of FIG. 5B, the information associated with the image may be meta data information 440 of the image. The meta data information 440 may include information such as a title, a capture time, storage information, resolution, a size, a direction, and a focal length of the image, and the like. Such information may be automatically generated after the image is captured, and may be processed in association with the image.

In another example, as illustrated in (b) of FIG. 5C, the information associated with the image may be application information 450 related to the image. For example, the information associated with the image may be an application enabling editing of the image. In this case, when the application related to the image has not been installed in the mobile terminal, information for downloading the application related to the image may be displayed together. Accordingly, the user may easily access a function for utilizing the image, as well as the image.

Also, the information associated with the image may be processed in association with the image by the user, or may be automatically associated to be processed. For example, immediately after the image is captured, the user may input memo information and associate the memo information with the image. In another example, the controller 180 may associate information of the image such as size information of the image, a capture point in time of the image, an image capture date, and the like, with the image.

That is, in a case in which the image is displayed on any one (for example, the first display unit) of the first and second display units, the controller 180 may display the information associated with the image on the other (for example, the second display unit) of the first and second display units, thus providing an effect as if the user views information related to a photograph on the rear side of the photograph.

Figure 6A:
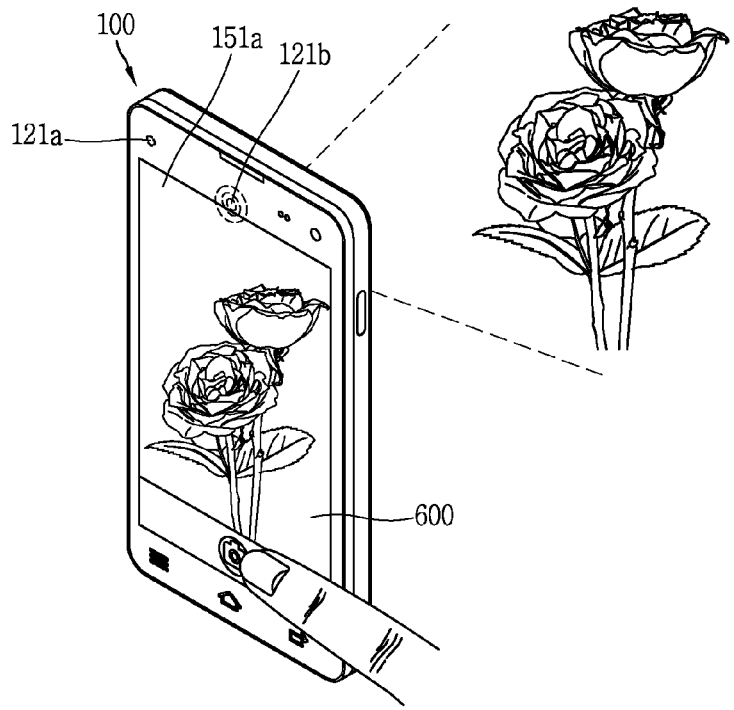
FIGS. 6A(a) to (b) and 6B(a) to (b) are conceptual views illustrating a method of displaying a captured image and information associated with the captured image, when an image is captured using the first and second display units.
Figure 6A:
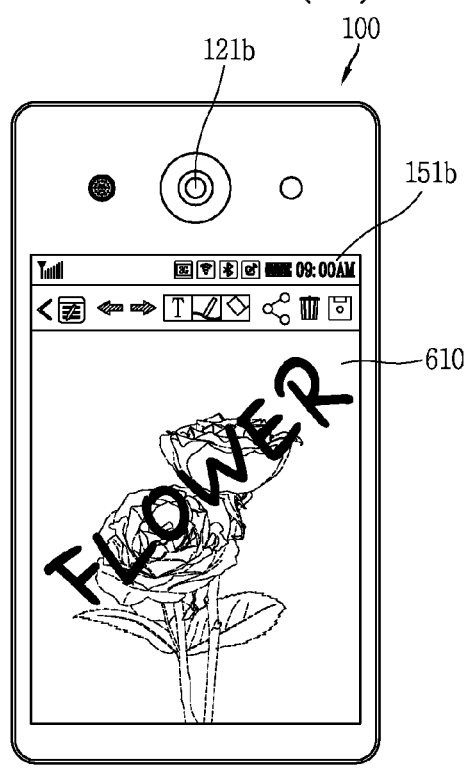
Figure 6B:
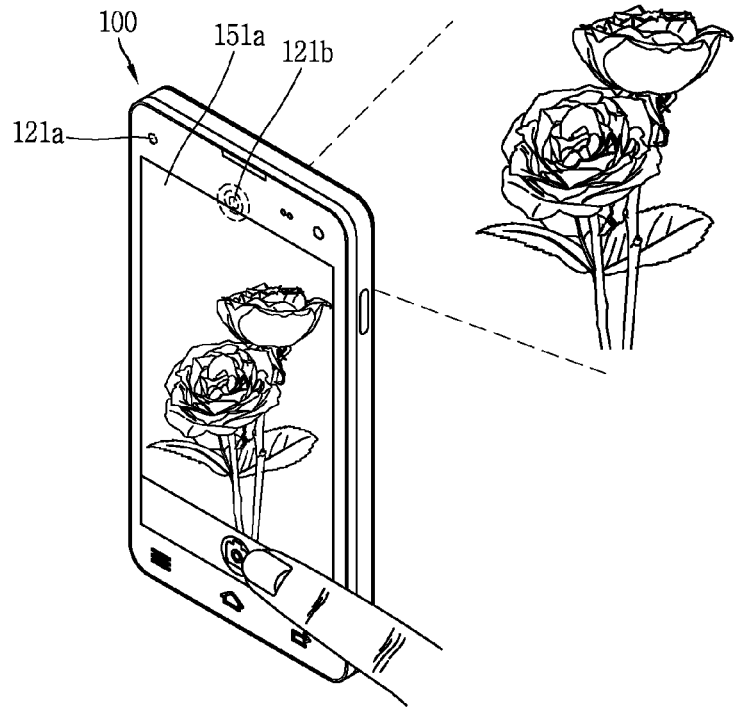
Figure 6B:
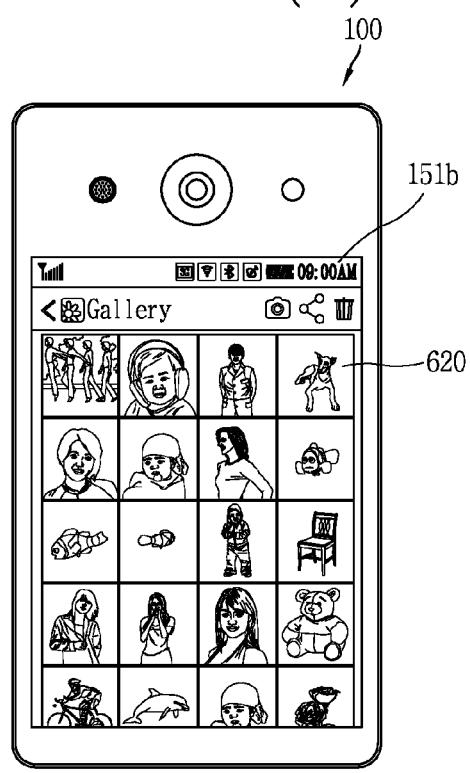
Figure 7A:
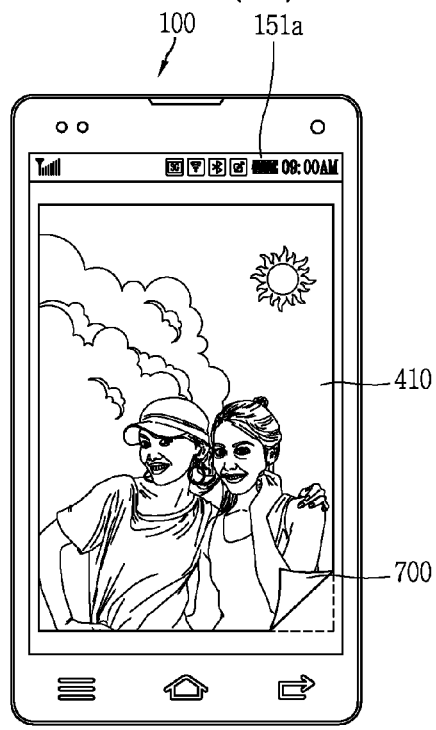
FIG. 7(a) to (d) is a conceptual view illustrating a method of outputting a graphic object indicating that there is information associated with an image in one region of the image, when the image is displayed on any one of the first and second display units in any one among the first and second display modes.
Figure 7B:
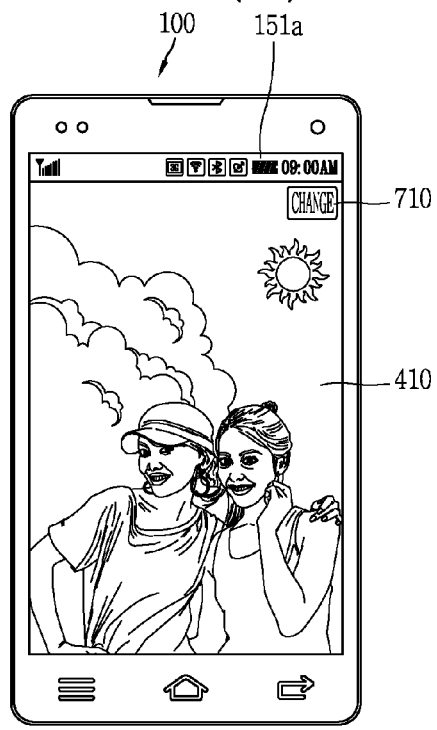
Figure 7C:
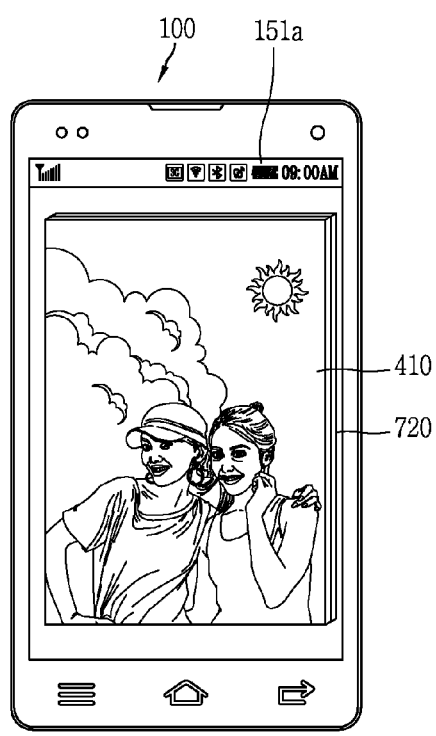
Figure 7D:
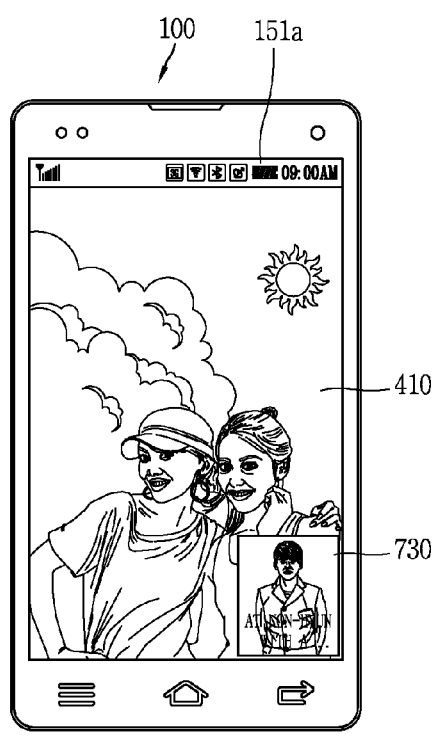

Hereinafter, a method of displaying a captured image and information associated with the image in a case in which the image is captured by using the first and second display units in the mobile terminal having the first and second display units will be described. FIGS. 6A and 6B are conceptual views illustrating a method of displaying a captured image and information associated with the captured image, when an image is captured using the first and second display units.

The mobile terminal according to an exemplary embodiment of the present disclosure may include a front camera 121a and a rear camera 121b that capture images in different directions. In this case, the controller 180 may display the image received from the front camera 121 and the image received from the rear camera 121b on the first and second display units 151a and 151b, respectively.

For example, an image received from a camera may be displayed on a display unit disposed in a direction opposite a direction in which the image was captured by the camera. In detail, the image received from the front camera 121a may be displayed on the second display unit 151b, and the image received from the rear camera 121b may be displayed on the first display unit 151a. Accordingly, the user may be provide with the images received form the front and rear cameras 121a and 121b through the display units.

Also, in a case in which an image is captured by using any one of the front and rear cameras 121a and 121b, the controller 180 may display the captured image on any one of the first and second display units. In this case, screen information for receiving information to be associated with the captured image may be displayed on the other of the first and second display units.

For example, as illustrated in (a) of FIG. 6A, in a case in which the captured image is displayed on the first display unit 151a, screen information 610 for receiving information to be associated with the captured image may be displayed on the second display unit 151b.

In this case, the screen information for receiving information to be associated with the captured image may be the screen information 610 for receiving a trace of a user's touch input. For example, as illustrated in (b) of FIG. 6A, the screen information 610 for displaying a trace of a touch input may be displayed on the second display unit 151b. Accordingly, the user may easily input simple information related to the captured image through a touch.

In another example, as illustrated in (a) of FIG. 6B, the user may capture an image by using the rear camera 121b. In this case, the captured image may be displayed on the first display unit 151a.

When the captured image is displayed on the first display unit 151a, the controller 180 may output screen information 620 for receiving an image to be associated with the captured image to the second display unit 151b. For example, as illustrated in (b) of FIG. 6B, screen information 620 including thumbnail images representing a plurality of images stored in the memory unit 170 may be displayed on the second display unit 151b.

Namely, in an exemplary embodiment of the present disclosure, information to be associated with the captured image may be directly received form the user or information previously stored in the memory unit 170 may be used. In this manner, the user may associate various information with the image and may be provided with information associated with the image together, as well as the image, afterwards.

Hereinafter, a method of outputting a graphic object indicating that there is information associated with an image to one region of the image when the image is displayed on any one of the first and second display units in any one of the first and second display modes will be described. FIG. 7 is a conceptual view illustrating a method of outputting a graphic object indicating that there is information associated with an image in one region of the image, when the image is displayed on any one of the first and second display units in any one of the first and second display modes.

In a case in which an image is displayed on at least one of the first and second display units according to any one of the first and second modes, the controller 180 may display a graphic object in one region of the image. The graphic object may serve to inform the user that there is information associated with the image. Also, the graphic object may serve to indicate that information associated with the image is displayed on the second display unit so that the user may check the second display unit.

The graphic object may be output to the display unit in various manners. For example, as illustrated in (a) of FIG. 7, the image may be displayed such that a corner 700 of the image is folded down. That is, the user may recognize that there is certain information on the rear of the image intuitively. Accordingly, in an exemplary embodiment of the present disclosure, the user may be guided to make a motion of checking the display unit other than the display unit on which the current image is displayed.

In another example, as illustrated in (b) of FIG. 7, a graphic object 710 denoting a function of displaying information associated with the image may be output to the display unit on which the image is displayed. That is, when the graphic object 710 is selected, the controller 180 may switch the image to the information associated with the image to display the information on the display unit on which the image is displayed.

Here, in a case in which the image is displayed in the second display mode, when the information associated with the image is displayed on the display unit on which the image is displayed, the controller 180 may display the image on the display unit on which the information associated with the image has been displayed. For example, in a case in which the image is displayed on the first display unit 151a, when the graphic object 710 is selected, the information associated with the image may be displayed on the first display unit 151a. also, the image may be displayed on the second display unit 151b.

In another example, as illustrated in (c) of FIG. 7, the controller 180 may display a plurality of images in an overlapping manner. Accordingly, by displaying the plurality of images, the user may be informed that there is information 720 associated with the image.

In another example, as illustrated in (d) of FIG. 7, the controller 180 may display a thumbnail image 730 representing information associated with the image in one region of the image. Accordingly, the controller 180 may show the user both the image and the information associated with the image.

Through the graphic object, in an exemplary embodiment of the present disclosure, the fact that there is information associated with the image can be more effectively provided for the user. Also, the user may easily view the information associated with the image through a simple manipulation by using the graphic object.

Figure 8A:
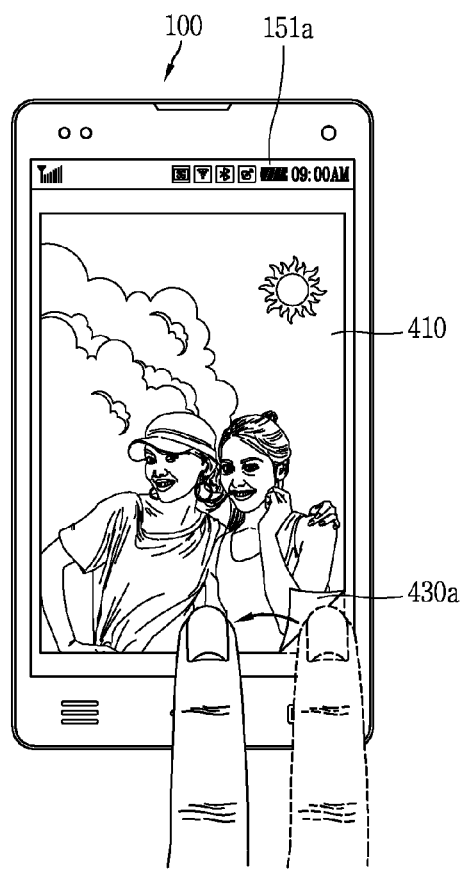
FIGS. 8A(a) to (b), 8B(a) to (b), 8C(a) to (b) and 8D(a) to (b) are conceptual views illustrating a method of switching a display unit displaying information associated with an image, in a state in which the image is displayed.
Figure 8A:
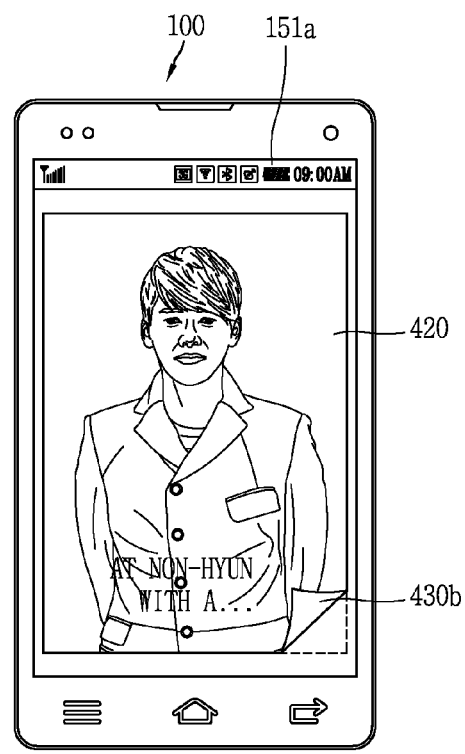
Figure 8B:
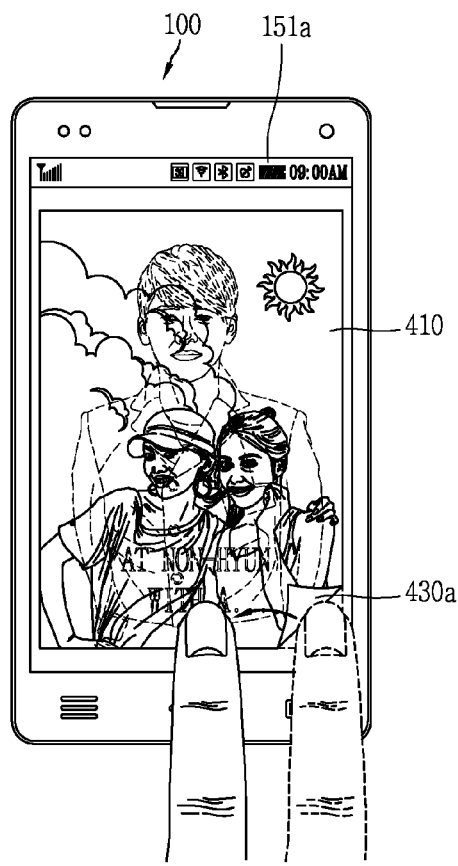
Figure 8B:
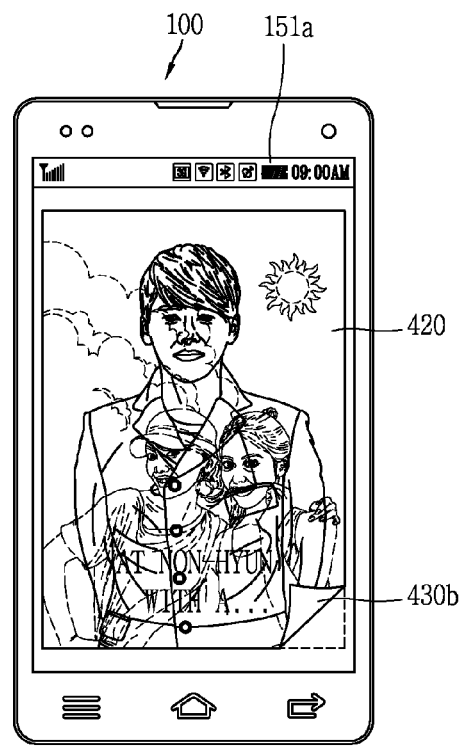

Hereinafter, a method of displaying information associated with an image in a state in which the image is displayed will be described. FIGS. 8A and 8B are conceptual views illustrating a method of switching a display unit displaying information associated with an image, in a state in which the image is displayed.

When the mobile terminal is in the first display mode, in a case in which an image is displayed on any one of the first and second display units, in a case in which an image is displayed on any one of the first and second display units 151a and 151b, the controller 180 may display a graphic object indicating that there is information associated with the image in one region of the image.

Also, when the mobile terminal is in the second display mode, in a case in which an image is displayed on any one of the first and second display units 151a and 151b, the controller 180 may display a graphic object indicating that there is information associated with the image in one region of the image on the other of the first and second display units, in order to indicate that there is information associated with the image.

In this case, the user may view the information associated with the image by applying a touch to the graphic object.

For example, as illustrated in (a) and (b) of FIG. 8A, when the mobile terminal is in the first display mode, the controller 180 may output an image 410 to any one of the first and second display units (for example, to the first display unit 151a). In this case, when a touch is applied to the graphic object, the information associated with the image may be displayed on the display unit (for example, on the first display unit 151a) on which the image is displayed.

In another example, as illustrated in (a) and (b) of FIG. 8B, when the mobile terminal is in the second display mode, when a touch is applied to a graphic object 430a, the controller 180 may interchange screen information respectively displayed on the first and second display units. For example, in a state in which the image is displayed on the first display unit 151a and the information associated with the image is displayed on the second display unit 151b, when a touch is applied to the graphic object 430a, the image may be displayed on the second display unit 151b and the information associated with the image may be displayed on the first display unit 151a.

Also, in response to a pre-set type of touch applied to the image, the controller 180 may output the information associated with the image.

Figure 8C:
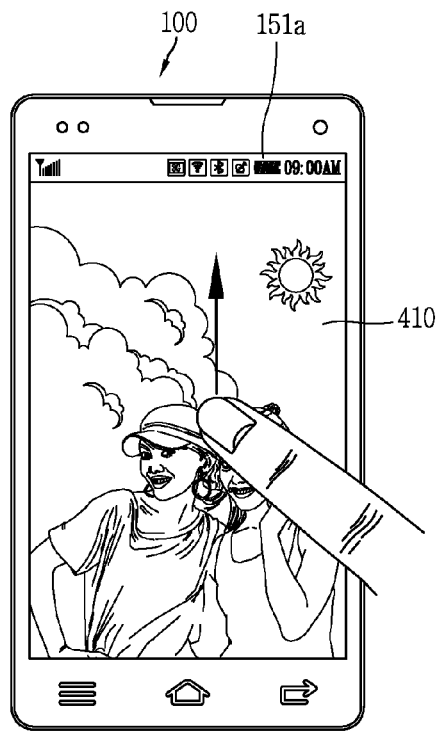
Figure 8C:
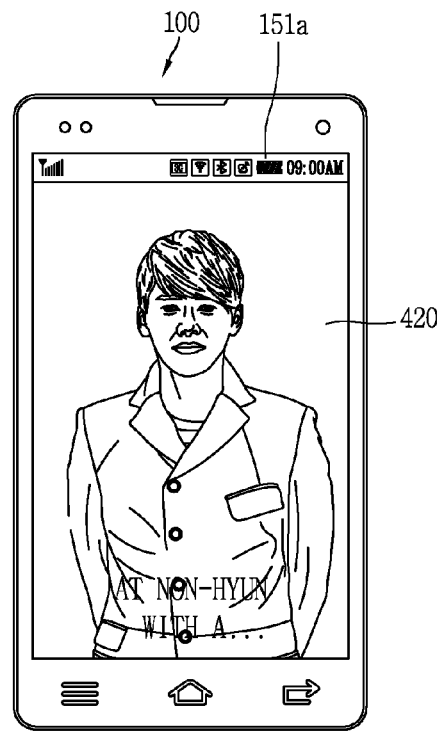

For example, as illustrated in (a) and (b) of FIG. 8C, when the mobile terminal is in the first display mode, when a pre-set type of touch is applied to the display unit (for example, the first display unit 151a) on which the image 410 is displayed, the controller 180 may output information 420 associated with the image to the display unit (for example, the first display unit 151a) on which the image is displayed. Here, the pre-set type of touch may be a drag input applied in a pre-set direction. For example, the pre-set type of touch may be a drag input moving upwards based on the front side of the mobile terminal body.

In another example, as illustrated in (a) and (b) of FIG. 8D, when the mobile terminal is in the second display mode, in response to an applied pre-set type of touch, the controller 180 may interchange the display units on which the image and the information associated with the image are displayed, respectively. For example, when the image 410 may be displayed on the first display unit 151a and the information 420 associated with the image may be displayed on the second display unit 151b. In this case, as illustrated in (a) of FIG. 8D, when a pre-set type touch is applied to the first display unit 151a, the controller 180 may display the information 420 associated with the image displayed on the second display unit 151b, on the first display unit 151a. Also, as illustrated in (b) of FIG. 8D, the controller 180 may display the image 410 on the second display unit 151b.

In this manner, in an exemplary embodiment of the present disclosure, various types of information related to an image can be provided for the user through a simple manipulation. Also, the user may check information displayed on the rear display unit without having to move the terminal body of the mobile terminal.

Figure 9A:
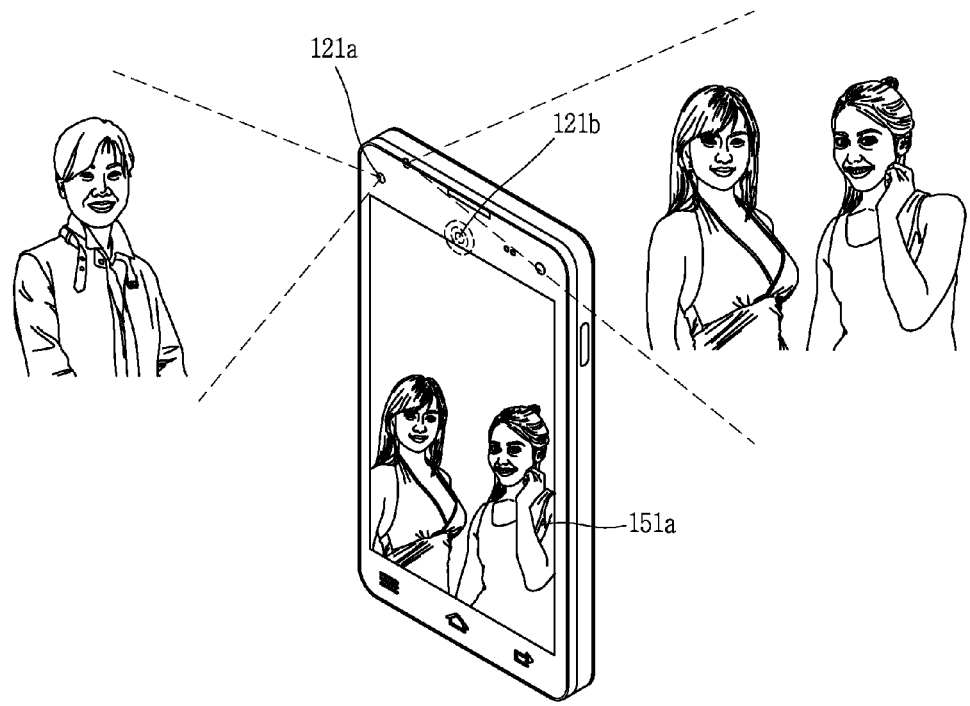
FIGS. 9A(a) to (c) and 9B(a) to (c) are views illustrating a method of displaying images captured by a plurality of cameras by using the first and second display units.
Figure 9A:
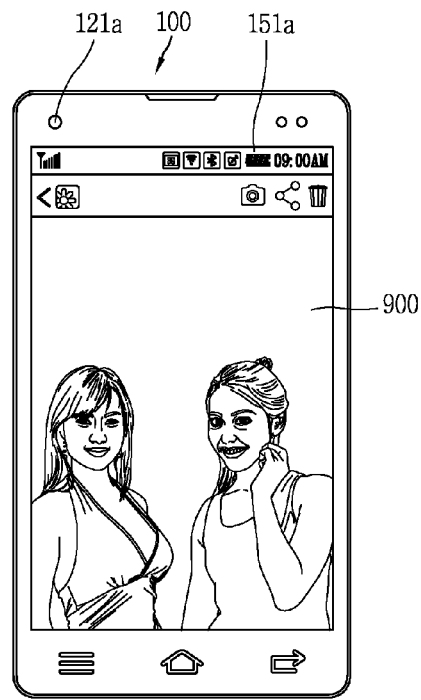
Figure 9A:
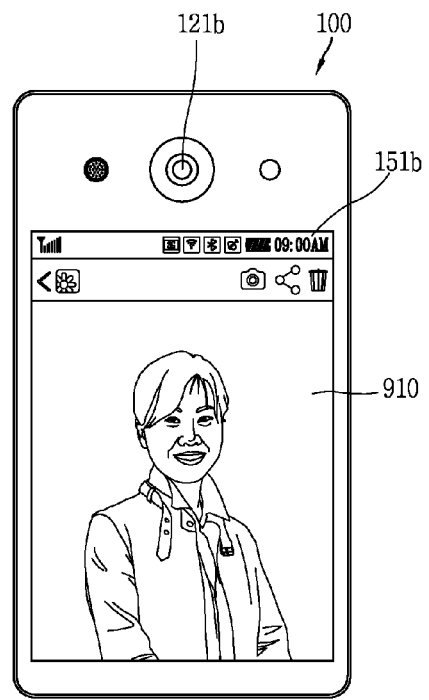
Figure 9B:
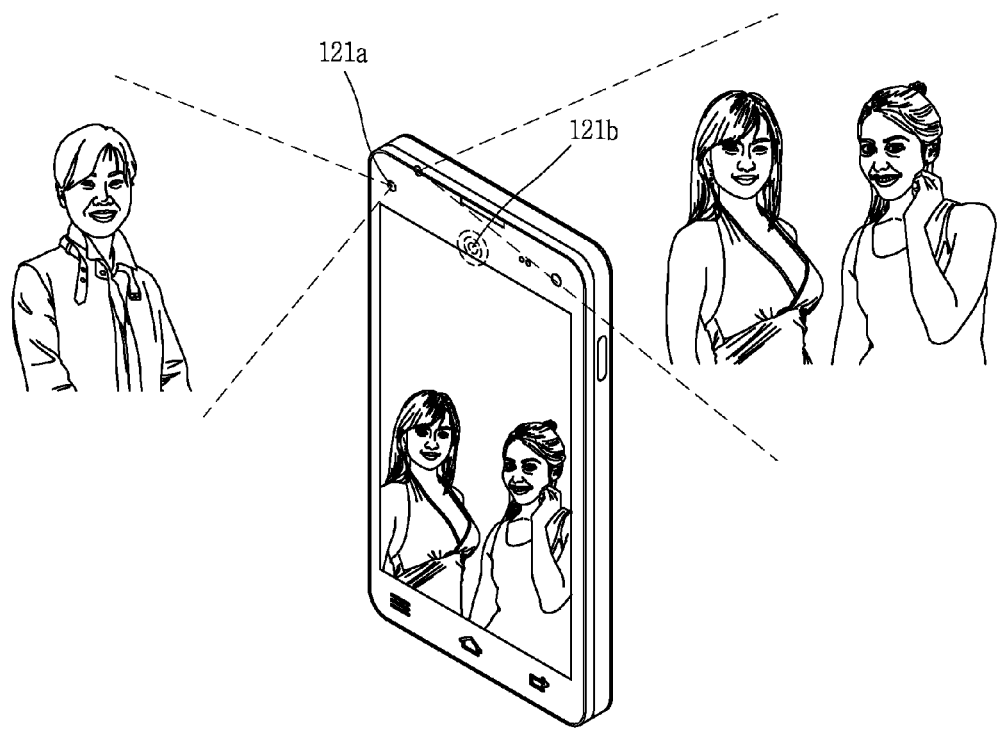
Figure 9B:
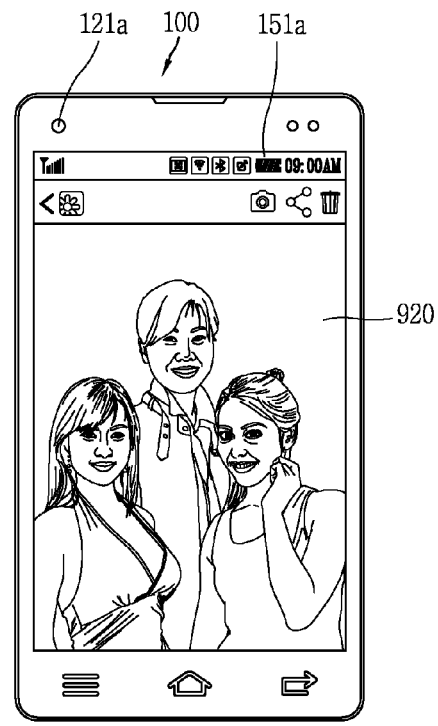
Figure 9B:
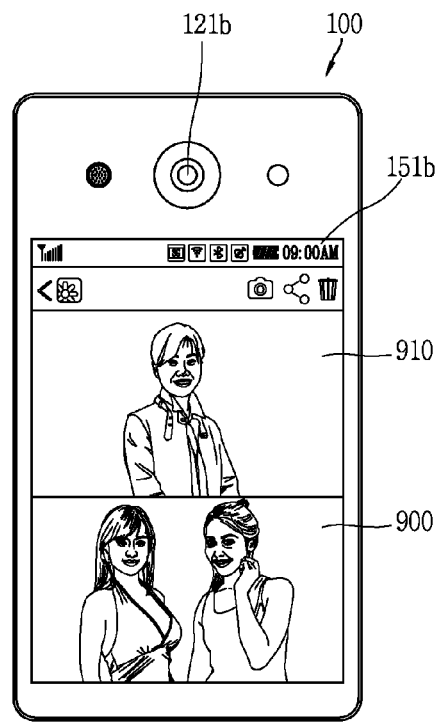
Figure 10A:
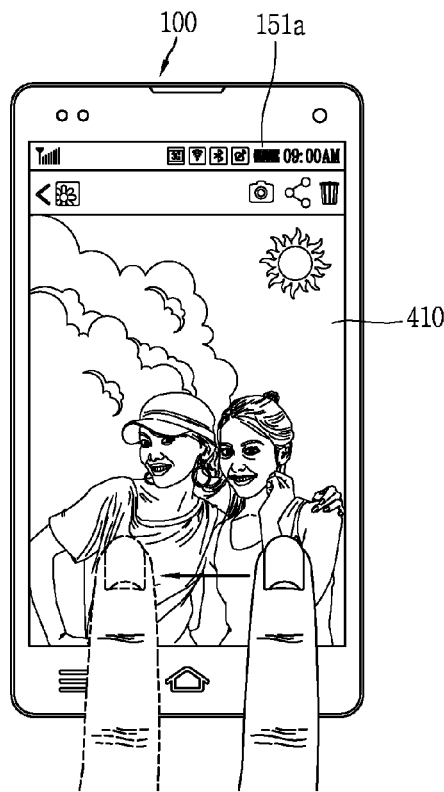
FIG. 10(a) to (d) is a conceptual view illustrating a control method in a case in which an image and information associated with the image are displayed on the first and second display units in the second display mode.
Figure 10B:
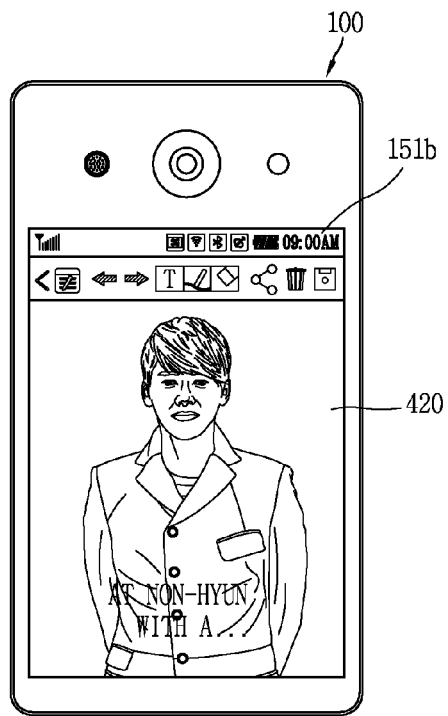
Figure 10C:
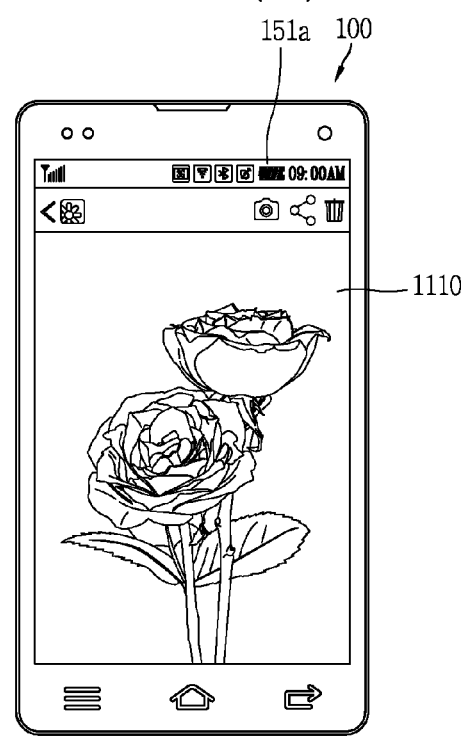
Figure 10D:
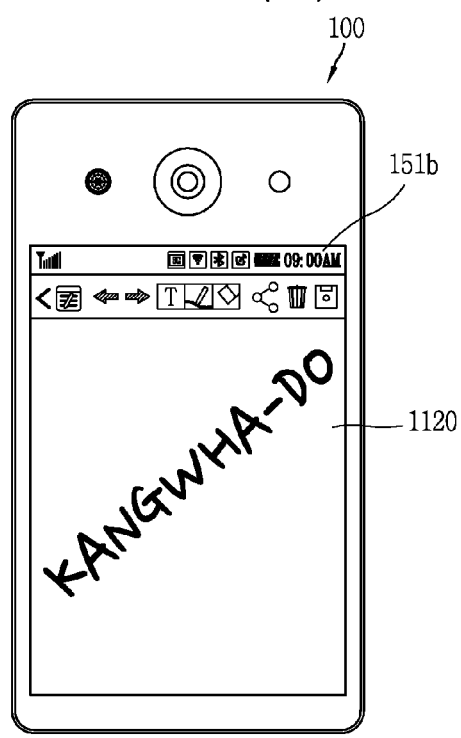

Hereinafter, a method of displaying images captured by a plurality of cameras will be described. FIGS. 9A and 9B are views illustrating a method of displaying images captured by a plurality of cameras by using the first and second display units.

The mobile terminal according to an exemplary embodiment of the present disclosure may include a plurality of cameras that capture images in different directions. For example, the mobile terminal according to an exemplary embodiment of the present disclosure may include may include a front camera 121a for capturing a front side of the mobile terminal and a rear camera 121b for capturing a rear side of the mobile terminal.

As illustrated in (a) of FIG. 9A, the user may capture images by using a plurality of cameras. In this case, when images are captured by using the plurality of cameras, the controller 180 may enter the second display mode.

In this case, as illustrated in (b) and (c) of FIG. 9A, the controller 180 may display an image captured by a camera on a display unit in a direction opposite the image capture direction of the camera. In detail, an image 910 captured by using the front camera 121a may be displayed on the second display unit 151b, and an image 900 captured by the rear camera 121b may be displayed on the first display unit 151a. That is, in this manner, the user may view the images captured by the camera intuitively. Also, the display units displaying the captured images can be freely changed.

Meanwhile, in a case in which images are captured by using the plurality of cameras, the controller 180 may generate a combined image 920 of the captured images.

When the combined image 920 is generated, the controller 180 may display the combined image 920 on any one of the first and second display units 151a and 151b.

For example, as illustrated in (a) of FIG. 9B, the controller 180 may capture images by using the plurality of cameras 121a and 121b. In this case, as illustrated in (b) of FIG. 9B, the controller 180 may generate the combined image 920 of the images captured by using the plurality of cameras 121a and 121b and display the generated combined image 920 on the first display unit 151a. Also, as illustrated in (c) of FIG. 9B, the controller 180 may display the plurality of images 900 and 910 separately on the second display unit 151b. In this case, the display unit on which the combined image and the plurality of images are displayed may be changed. In this manner, in an exemplary embodiment of the present disclosure, both a combined image and separate images can be provided for the user.

Hereinafter, a control method in a case in which an image and information associated with the image are displayed on the first and second images in the second display mode will be described. FIG. 10 is a conceptual view illustrating a control method in a case in which an image and information associated with the image are displayed on the first and second display units in the second display mode.

When the mobile terminal is in the second display mode, the controller 180 may manipulate any one of the first and second display units 151a and 151b to control both the first and second display units 151a and 151b. That is, the controller 180 may also change screen information displayed on the second display unit 151b with a control command for changing screen information displayed on the first display unit 151a.

In detail, when the mobile terminal is in the second display mode, the controller 180 may display the image on any one of the first and second display units 151a and 151b and display the information associated with the image on the other of the first and second display units 151a and 151b. For example, as illustrated in (a) and (b) of FIG. 10, the image 410 may be displayed on the first display unit 151a and the information 420 associated with the image may be displayed on the second display unit 151b.

In this case, in response to a touch applied to the first display unit 151a, the controller 180 may output an image 1110 different from the currently displayed image 410, among a plurality of images stored in the memory unit 170, on the first display unit 151b. Also, the controller 180 may change the information 420 associated with the image displayed on the second display unit 151b to information 1120 associated with the different image 1110. That is, even without a direct control on the second display unit 151b, the controller 180 may also control the screen information of the second display unit 151b by simply manipulating the first display unit 151a.

Also, although not shown, in a case in which there is no information associated with the different image 1110, the controller 180 may not display any screen information on the second display unit 151b or continuously display the screen information (for example, the information 420 related to the image before the different image is displayed) which has been previously output.

Thus, the user may view the associated information through the first and second display units 151a and 151b all the time.

In the above description, the second display unit 151b is controlled by manipulating the first display unit 151a, but this can also be applied in the same manner when the first display unit 151a is controlled by manipulating the second display unit 151b.

Figure 11A:
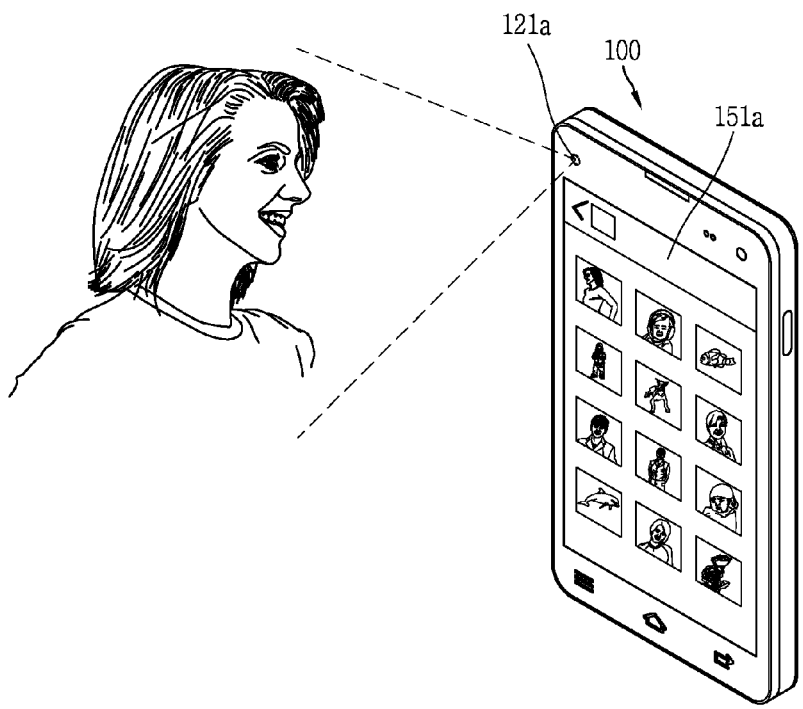
FIG. 11(a) to (c) is a conceptual view illustrating a method of determining a display unit for displaying an image and information associated with the image.
Figure 11B:
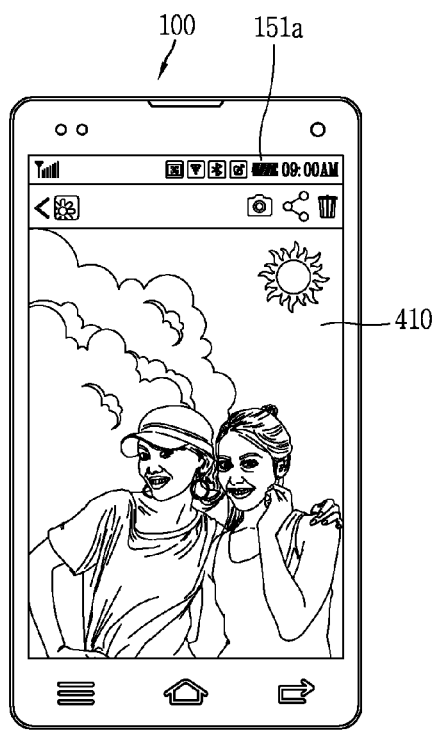
Figure 11C:
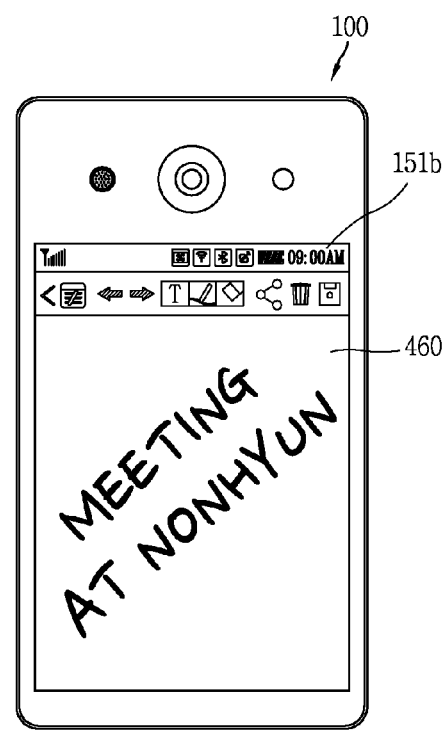

Hereinafter a method of determining a display unit displaying an image and information associated with the image in the second display mode will be described. FIG. 11 is a conceptual view illustrating a method of determining a display unit for displaying an image and information associated with the image.

When the mobile terminal is in the second display mode, the controller 180 may control both the first and second display units 151a and 151b to display screen information, respectively.

In this case, the controller 180 may determine on which of the first and second display units, an image is to be displayed, based on a pre-set condition. Here, the pre-set condition may be whether which one of the display units the user is currently viewing.

As illustrated in (a) of FIG. 10, in order to determine a display unit that the user is currently viewing, the controller 180 may recognize the pupil of the user. The pupil of the user may be recognized by using an infrared camera separately provided. Also, the controller 180 may use a face image of the user captured by a general camera.

In this case, the controller 180 may display an image on the display unit that the user is viewing, and information associated with the image on the display unit that the user is not viewing.

For example, as illustrated in (b) and (c) of FIG. 10, the controller 180 may display the image 140 on the first display unit 151a determined to be currently viewed by the user, and display the information 460 associated with the image on the second display unit 151b determined to be not currently viewed by the user.

That is, the controller 180 may determine that the image 410 requested by the user is major information and display the image 410 on the first display unit 151a that the user is currently viewing so that the user can immediately view the image 410. Also, the controller 180 may determine that the information 460 associated with the image is subsidiary information and display the information 460 associated with the image on the second display unit 151b that the user is not viewing.

In an exemplary embodiment of the present disclosure, in a case in which information is displayed by using double-sided display units, associated information can be displayed on each of the double-sided display units. Accordingly, the present disclosure can provide a method enabling the user to view information on the double-sided display units intuitively.

Also, the present disclosure can provide a method of changing a position of information displayed on the double-sided display units by simply manipulating the information displayed on both display units. Thus, the user can conveniently use the double-sided display units.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   first and second display units disposed on different sides;
   a memory unit configured to store both an image and information associated with the image; and
   a controller configured to control at least one of the first and second display units to display the image and the information associated with the image according to any one among first and second display modes,
   wherein, in the first display mode, the image and the information associated with the image are displayed on any one of the first and second display units, and
   wherein, in the second display mode, when the image is displayed on any one of the first and second display units, the information associated with the image is displayed on the other of the first and second display units,
   wherein the first and second display modes is determined based on a pre-set condition which is related to storage information of the image,
   wherein, when the storage information of the image includes first information, the controller enters the first display mode and displays the image on any one of the first and second display units according to the first display mode,
   wherein, when the storage information of the image includes second information different from the first information, the controller enters the second display mode, displays the image on any one of the first and second display units according to the second display mode and displays the information associated with the image on the other of the first and second display units, and
   wherein, when the image is displayed on any one of the first and second display units according to the second display mode, the controller displays a graphic object indicating that there is information associated with the image on the second display unit, at a portion of the image displayed on the any one of the first and second display units.

2. The mobile terminal of claim 1, wherein when the image is displayed on any one of the first and second display units according to the first display mode, the controller outputs a graphic object indicating that there is information associated with the image to one region of the image.

3. The mobile terminal of claim 1, wherein, in response to selection of the graphic object, the controller provides control to display the image displayed on the other of the display units, on the any one of the display units, and displays the image displayed on the any one of the display units, on the other of the display units.

4. The mobile terminal of claim 1, wherein when a pre-set type of touch is applied to the image displayed on the any one of the display units, the controller controls the first and second display units such that the image is output to the other of the display units and the information associated with the image is output to the any one of the display units.

5. The mobile terminal of claim 1, further comprising:
   at least two camera units configured to capture images in different directions,
   wherein the pre-set condition is a condition under which the at least two camera units capture images together, and
   in a case in which the images received from the at least two camera units are captured together according to a user request, the controller displays any one of the at least two captured images on any one of the first and second display units and displays the other of the at least two captured images on the other of the first and second display units.

6. The mobile terminal of claim 5, wherein when images captured from the at least two camera units are captured together, the controller outputs a combined image of the at least two images to any one of the first and second display units.

7. The mobile terminal of claim 1, wherein a plurality of images and information associated with the plurality of images are stored in the memory unit, and
   in a state in which any one of the plurality of images and information associated with the any one of the plurality of images are respectively displayed on the first and second display units according to the second display mode,
   when the displayed any one of the plurality of images is changed to another among the plurality of images, the information associated with the any one of the plurality of images is changed to information associated with another among the plurality of images, so as to be displayed.

8. The mobile terminal of claim 7, wherein when the image displayed on the any one of the first and second display units is not displayed any longer, the controller does not display the information associated with the image displayed on the other of the plurality of display units any longer.

9. The mobile terminal of claim 1, further comprising:
   a sensing unit configured to sense the pupil of a user,
   wherein when the mobile terminal is in the second display mode, the controller displays the image on the display unit that the sensed user's pupil is viewing, among the first and second display units, and displays the information associated with the image on the other of the first and second display units.

10. The mobile terminal of claim 1, wherein when the mobile terminal is in the second display mode and the information associated with the image displayed on the any one of the first and second display units is not stored in the memory unit, the controller displays recommendation information related to the image displayed on the any one of the first and second display units.

11. The mobile terminal of claim 10, wherein the recommendation information is detected based on image analysis information of the image displayed on the any one of the first and second display units.

12. The mobile terminal of claim 1, further comprising:
a camera unit configured to capture an image,
wherein the pre-set condition is a condition under which an image is captured by using the camera unit, and
in a state in which the image captured by using the camera unit is displayed on any one of the first and second display units, the controller outputs screen information for receiving memo information from the user to the other of the first and second display units.

13. The mobile terminal of claim 12, wherein the memo information received from the user is processed in association with the captured image so as to be output together with the captured image, and when the captured image is displayed on any one of the first and second display units, the controller displays the memo information received from the user on the other of the first and second display units.

14. The mobile terminal of claim 1, wherein when a control command for displaying an image stored in the memory unit on at least one of the first and second display units is received, the controller displays screen information for selecting any one of the first and second display modes on any one of the first and second display units.

15. A method for controlling a mobile terminal comprising first and second display units disposed on different sides of the mobile terminal, the method comprising:
storing both an image and information associated with the image;
controlling at least one of the first and second display units to display the image and the information associated with the image according to any one among first and second display modes;
in the first display mode, displaying the image and the information associated with the image on any one of the first and second display units;
in the second display mode, when the image is displayed on any one of the first and second display units, displaying the information associated with the image on the other of the first and second display units;
determining the first and second display modes based on a pre-set condition which is related to storage information of the image;
when the storage information of the image includes first information, entering the first display mode and displaying the image on any one of the first and second display units according to the first display mode; and
when the storage information of the image includes second information different from the first information, entering the second display mode, displaying the image on any one of the first and second display units according to the second display mode, and displaying the information associated with the image on the other of the first and second display units,
wherein when the image is displayed on any one of the first and second display units according to the second display mode, displaying a graphic object indicating that there is information associated with the image on the second display unit, at a portion of the image displayed on the any one of the first and second display units.

16. The method of claim 15, wherein when a pre-set type of touch is applied to the graphic object, the image displayed on the any one of the first and second display units is displayed on the other of the first and second display units, and the information associated with the image displayed on the other of the first and second display units is displayed on the any one of the first and second display units.

17. The method of claim 15, wherein the information associated with the image displayed on the other of the first and second display units is a combined image combined with the image displayed on the any one of the first and second display units.

18. The method of claim 17, wherein when the image displayed on the any one of the first and second display units is not output any longer, the information associated with the image displayed on the other of the plurality of display units is not output any longer.

* * * * *